United States Patent [19]

Testone

[11] 4,435,195
[45] Mar. 6, 1984

[54] FILTER UNIT AND IONIZING UNIT COMBINATION

[75] Inventor: Anthony Q. Testone, Lee, Mass.

[73] Assignee: Static, Inc., Skippack, Pa.

[21] Appl. No.: 400,900

[22] Filed: Jul. 22, 1982

[51] Int. Cl.³ .............................................. B03C 3/01
[52] U.S. Cl. ........................................ 55/126; 55/152; 55/385 A; 422/121; 361/231
[58] Field of Search ................ 55/126, 146, 152, 279, 55/385 A, 124; 422/121; 361/229, 231, 232

[56] References Cited

U.S. PATENT DOCUMENTS

| | | | |
|---|---|---|---|
| 940,431 | 11/1909 | Chapman | 55/152 |
| 3,747,301 | 7/1973 | Glover et al. | 55/126 |
| 4,026,684 | 5/1977 | Finger | 55/126 |
| 4,175,936 | 11/1979 | Lough et al. | 55/385 A |
| 4,178,159 | 12/1979 | Fecteau | 55/385 A |
| 4,333,750 | 6/1982 | Helmus et al. | 55/385 A |

FOREIGN PATENT DOCUMENTS

| | | | |
|---|---|---|---|
| 56-78645 | 6/1981 | Japan | 55/152 |

*Primary Examiner*—David L. Lacey
*Attorney, Agent, or Firm*—Irvin A. Lavine

[57] ABSTRACT

Apparatus for introducing filtered, ionized air into a clean room comprises a HEPA filter unit and a metal ionizing grid unit supported in a frame, secured to the discharge face of the filter unit. A seal is provided between the filter and ionizing grid frame. The apparatus is supported by T-rails, and a seal is provided between the frame and the T-Rails.

11 Claims, 4 Drawing Figures

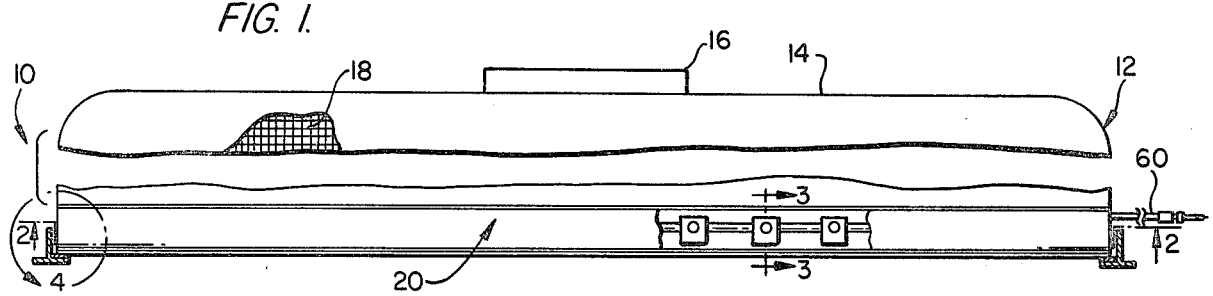
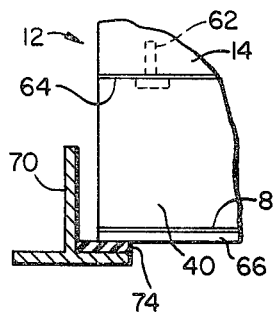
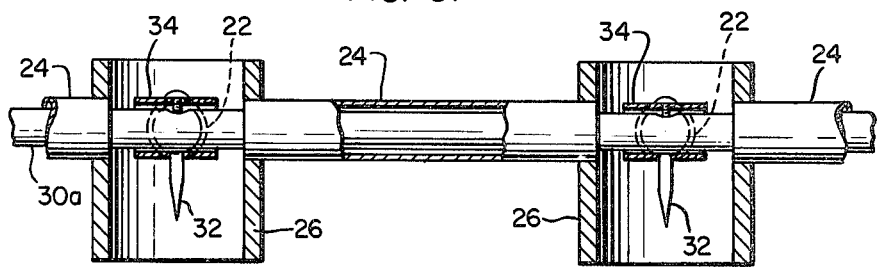
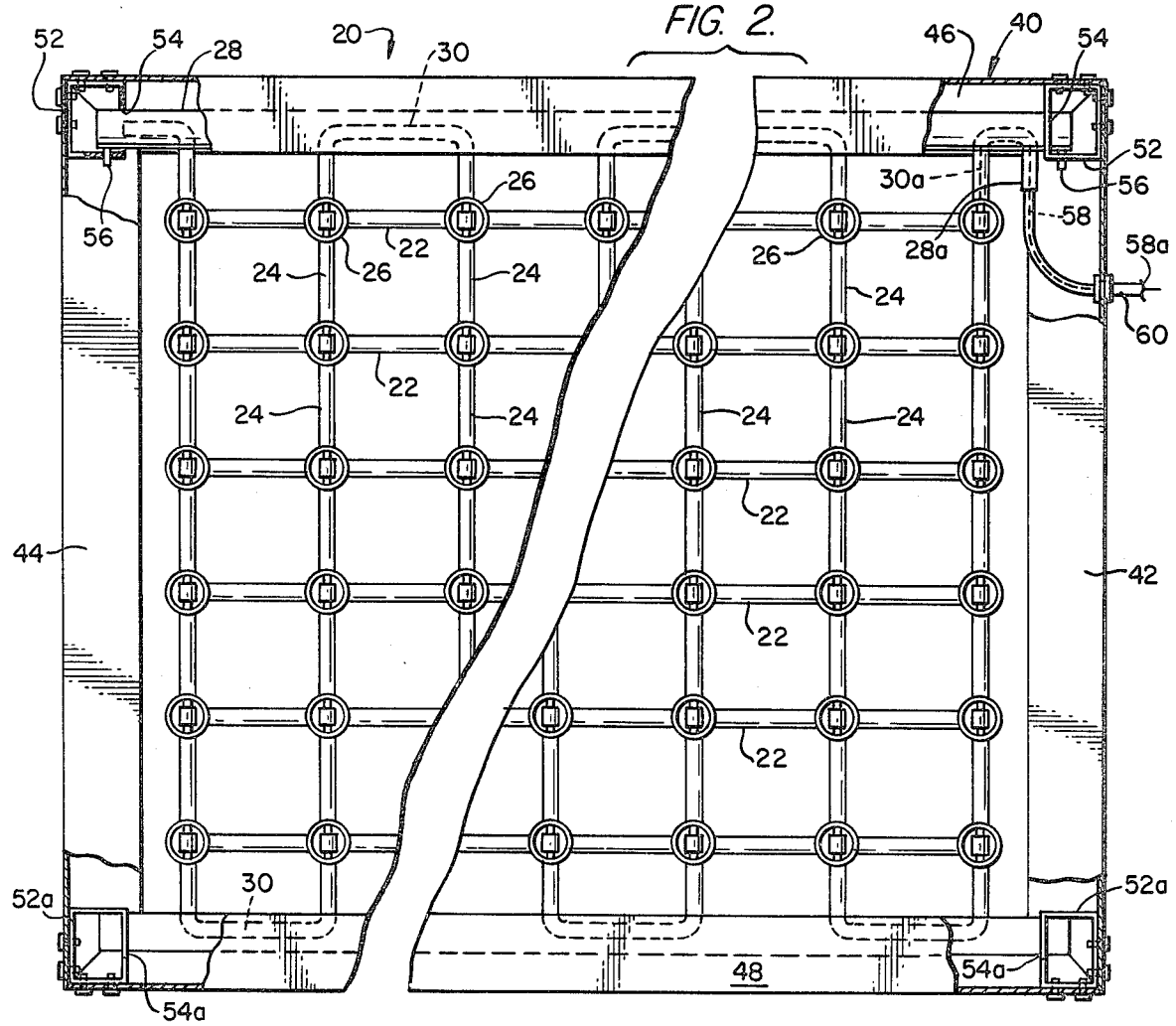

FILTER UNIT AND IONIZING UNIT COMBINATION

BACKGROUND OF THE INVENTION

The present invention relates to an apparatus for delivering filtered, ionized air into spaces, such as the clean room of a manufacturing plant for electronic equipment.

It is known that certain industrial operations benefit from being performed in substantially dust-free atmosphere. To that end, rooms designated as "clean rooms" are provided, which are sealed against the entry of air, except air which is intentionally delivered into the room, this air being filtered. In the installation of these clean rooms, the air is preferably filtered through a type of filter known as a HEPA filter, which is highly effective in removing all but the smallest particles of dust.

It has been recognized, however, that even these HEPA filters did not provide a sufficient cleansing of the air, and that, in fact, some very small dust particles passed through the HEPA filter and entered the room, to the detriment of the manufacturing operations proceeding therein. For example, dust particles which were statically charged could contact work products in process, and render them useless. Such work products include microcircuits.

To overcome this problem, it has been known to provide ionizing units to ionize the air, and the particles, so as to render them statically neutral. In some installations, the HEPTA filters were produced as filter units, having an entry port connected to an air duct, and having a discharge face. These filter units were placed on a support grid, suspended from the ceiling, the support grid being made up, in known fashion, of T-rails. Ionizing units, in the form of grids, were simply suspended below the discharge face of the filter unit, as by S-hooks.

The foregoing systems was unsatisfactory for several reasons. First, since the ionizing unit was at a location below the discharge face of the filter unit, it was possible for some of the filtered air, containing statically charged dust particles, to pass through the space between the discharge face of the filter unit and the ionizing unit, thereby passing outwardly and bypassing the ionizing unit. Thus, there was permitted the discharge of statically charged particles into the clean room. Further, the appearance was less attractive than desirable, there being provided a built-on or jury-rig appearance.

SUMMARY OF THE INVENTION

The present invention provides a combination filter unit and ionizing unit, hermetically joined together so as to prevent the discharge of air except air which passes both through the filter unit and through the ionizing unit. The filter unit is of standard construction, having a housing with a HEPA filter therein, a port for connection to an air duct on one face and an opposite discharge face. A frame is provided, of a size and shape to engage the housing surrounding the discharge face of the HEPA filter, the frame having an ionizing unit therein. A seal or gasket is provided between the frame and the filter unit housing, to prevent the escape of air from between the filter unit housing and the frame of the air ionizing unit. In addition, the frame is positioned on, engages and is supported by a conforming support made up of T-rails, with a seal or gasket between the frame and the T-rails. The ionizing unit is in the form of a grid made up of tubular elements which are conductive, and are arranged in a first set of parallel rows, and a second set of parallel rows, perpendicular to the first set of rows. Ionizing points of the ionizing unit are capacitively coupled to an insulated conductor, which is supplied with energy by the conductor of a shielded cable, the exterior shield of which is electrically connected to the conductive tubular elements of the ionizing unit. This construction eliminates the generation of harmful RF signals which can cause sensitive peripheral equipment to malfunction.

One of the objects of the present invention is to provide a superior construction for the introduction of air into a clean room, or the like, which will substantially eliminate the danger of contamination of work products in the clean room.

Another object of the present invention is the provision of an apparatus for substantially removing all the changed particles from introduction into a clean room.

Yet another object of the present invention is to provide a combination HEPA filter unit and an air ionizing unit, constructed so that substantially all of the air passing through the HEPA filter unit is subjected to ionization.

Other objects and many of the attendant advantages of the present invention will be readily understood from further consideration of the present specification, drawings and claims.

BRIEF DESCRIPTION OF THE DRAWINGS

FIG. 1 is an elevational view, with parts broken away, of a combination filter unit and air ionizing unit in accordance with the present invention.

FIG. 2 is a view taken on the line 2—2 of FIG. 1.

FIG. 3 is a cross-sectional view taken on the line 3—3 of FIG. 1.

FIG. 4 is an enlarged view of the structure within the circle designated 4 on FIG. 1.

DESCRIPTION OF THE PREFERRED EMBODIMENT

Referring now to the drawings, wherein like or corresponding reference numerals are used to designate like or corresponding parts throughout the several views, there is shown in FIG. 1 a combination filter unit and ionizing unit 10, the filter unit 12 including a housing 14 having an inlet 16, for cooperation with an air duct, not shown. Within the housing 14 is a standard HEPA filter 18, and as will be understood, the entire filter unit 12 is a known, commercially available unit, such as produced by several producers in the United States. The housing 14 is impervious to air, so that all of the air entering into the filter unit 12 must enter through the inlet 16, and all of the air which enters through inlet 16 must be discarded through a discharge face located at the bottom of the filter unit 12, as viewed in FIG. 1, being opposite the inlet 16. Adjacent the discharge face of the filter unit 12 is air ionizing grid unit 20.

Referring now to FIG. 2, there is shown, with parts broken away, the ionizing unit 20 including parallel rows of conductive tubular elements 22, and parallel rows of conductive tubular elements 24, the rows of tubular elements 24 being perpendicular to the rows of tubular elements 22, and being coplanar therewith. The tubular elements 22 in each row are in aligned, spaced relationship, as are the tubular elements 24 in each of the rows. The space between adjacent tubular elements 22 is occupied by a transverse tubular housing 26, and both the tubular elements 22 and the tubular elements 24 are connected to the tubular housings 26. Since the tubular elements 24 and 26 may be deemed to connect together the tubular housings, to form a grid, they are also considered to be connecting tubes.

Referring now to FIG. 3, there may be seen a row of connecting tubes or tubular elements 24, and tubular housings 26, to which they are joined. The connecting tubes 22, 24 and tubular housings 26 are of metal, such as steel, and are prevented from corrosion by a suitable coating, such as a baked-on epoxy. In FIG. 3, there may be seen the end of connecting tube 22 in dotted lines.

The ionizing unit 20 is provided with side rails 28, which are C-shape in cross-section, to permit threading of an insulated conductor 30 through connecting tubes 22 and tubular housings 26. It will be observed that the tubular housings 26 extend in positions distributed across the discharge face of the filter unit 12.

Within each of the tubular housings 26 there is provided an ionizing point 32 mounted on a conductive sleeve 34; the insulated conductor 30 passes through each of the conductive sleeves 34, so that, when connected to a source of alternating current, in known fashion, the ionizing point 32 will be capacitively coupled to conductor 30a of insulated conductor 30.

Since the tubular housings 26 are distributed over the discharge face of the filter unit 12, the ionizing points 32 are also similarly distributed, being supported by the conductive sleeve 34, the insulated conductor 30 and the connecting tubes 22, 24 and tubular housings 26.

The frame unit 40 is constructed of four inwardly channels 42, 44, 46, 48, made of metal, and joined at their corners by miter joints. The frame unit 40 also includes tubular blocks 52, one provided in each corner thereof, two of the tubular blocks 52 having openings 54 for receiving one of the side rails 28 of the ionizing unit 20. The other two tubular blocks designated 52a, are identical to the tubular blocks 52, except that they have slotted holes 54a therein for receiving the other side rail 28 of the ionizing unit 20. A suitable set screw 56 is provided in each of the tubular blocks 52 for engaging the side rail 28 received in the tubular block 52 to thereby positively electrically connect the ionizing unit 20 with the frame unit 20.

The frame unit 40 will be seen, therefore, to extend around the ionizing unit 20, and to support it.

The size and shape of the frame unit 40 conforms to the size and shape of the housing 14 of filter unit 12, and more particularly to that portion thereof which encompasses the discharge face of the filter unit 12.

The ionizing unit 20 is provided with alternating current electricity by means of a suitable alternating current generator, preferably one which produces square waves. The generator is connected to the insulated conductor 30 by means of a shielded cable 60 having an inner conductor 58 and an outer shield 58a, the former being connected to the conductor 30a of insulated conductor 30 and the latter being connected, mechanically and electrically, to the ionizing unit 40, as through a port member 28a extending from a rail 28.

Referring now to FIG. 4, there may be seen a fastener 62 which passes through the frame unit 40, and into the housing 14 of filter unit 12, to thereby secure together the filter unit 12, on the one hand, and the frame unit 40 and the ionizing unit 20 on the other hand; between them is a gasket or seal 64, engaging the lower edge of the housing 14 and the upper portion of the channels of the frame unit 40, so as to prevent the lateral passage of air between the filter unit 12 and the ionizing unit 20. The sealing means or gasket 64 may be a closed cell gasket, extruded sealant, etc.. Secured to the lower surface of the frame unit 40 is a grille face plate 66, of known construction, and used primarily for aesthetic purposes. Because it is generally in the form of an "eggcrate" it also has the function of directing the air perpendicularly to the plane of the grille face plate 66, itself.

There is also shown in FIG. 4, in cross-section, a T-rail 70, the grille face plate 66 resting upon a gasket or sealing material 74 which is between the grille face plate 66 and the T-rail 70, so as to prevent the passage of air between the T-rail 70 and the grille face plate 66. The grille face plate 66 may be secured, in known manner, to the bottom of the channels forming the frame unit 40, and provided with a seal or gasket 84, therebetween. The foregoing construction insures, therefore, that all of the air which is discharged from the discharge face of the filter unit 12 passes through the ionizing unit 20, and through the grille face plate 66, none of this air being permitted to escape, due to the presence of the seals or gaskets 64 and 84. Further, no air, dust particles, or the like may bypass the combination of the filter unit 12 and the ionizing unit 40, due to the seal or gasket 74 on the T-rails 70.

There has been provided an improved apparatus for delivering filtered, ionized air to a space, such as a clean room, the apparatus providing for the avoidance of the delivery into the room of dust particles above the size permitted passage by a standard HEPA filter, and also preventing entry into such space of statically charged particles.

In addition, there has been provided a unit, with its attendant supporting structure, which will prevent by-passing of air and dust particles around the combined filter unit and air ionizer unit.

The herein provided apparatus is not only efficient in the above particulars, but is of pleasing appearance.

It will be obvious to those skilled in the art that various changes may be made without departure from the spirit of the invention, and therefore the invention is not limited to that shown in the drawings described in the specification but only as indicated in the appended claims.

I claim:

1. Apparatus for introducing filtered, ionized air into a room comprising:
    (a) a filter unit including an air impervious housing having an air inlet on one face, an air discharge face opposite the air inlet, and filter material in the housing between the air inlet and the air discharge face,
    (b) an ionizing unit comprising a plurality of ionizing points, means supporting said ionizing points in positions distributed across the discharge face of the filter unit comprising insulated conductor means, means capacitively coupling said ionizing points to said conductor means, and conductive tubular means having said conductor means extending therethrough,
    (c) conductive frame means extending around said ionizing unit and including means for supporting said ionizing unit therein, said frame means conforming in size and shape to the air discharge face of the filter unit, and means for electrically connecting said frame means to said conductive tubular means, (d) means for securing said frame means to said filter unit housing at the discharge face thereof, and (e) sealing means for preventing the passage of air between said filter unit housing and said frame means.

2. The apparatus of claim 1, wherein said conductive tubular means comprises first and second parallel rows of connecting tubes in aligned, spaced relationship, the connecting tubes of the first and second rows being perpendicular and coplanar, and wherein said ionizing unit further comprises tubular housings transverse of and secured to said connecting tubes.

3. The apparatus of claim 2, wherein said means capacitively coupling said ionizing points comprises conductive sleeves on said insulated conductor means, each said ionizing point extending from and joined to a said conductive sleeve.

4. The apparatus of claim 1 or 2, and further comprising shielded cable means having an internal cable, and an external conductive shield, means connecting the internal cable to the conductor means of said insulated conductor means, and means connecting the external shield of said shielded cable means to said frame means.

5. The apparatus of claim 1, said frame means comprising a plurality of channels, each facing inwardly of said frame means.

6. The apparatus of claim 5, wherein each said channel defines a single side of said frame means, said channels having mitered joints at the corners of said frame means.

7. The apparatus of claim 5 or 6, wherein tubular blocks are provided at each of the corners of said frame means, within said channels.

8. The apparatus of claim 7, said tubular blocks having openings therein, and said conductive tubular means extending into the openings into said tubular blocks.

9. The apparatus of claim 8, wherein two of said tubular blocks have slot means forming said openings, said two slot means in said two tubular blocks receiving said conductive tubular means.

10. The apparatus of claim 1, and in combination therewith means for supporting said apparatus including horizontal flange means of the same size and shape as said frame means, and sealing means between and engaging said flange means and said frame means for preventing passage of air therebetween.

11. The apparatus of claim 1, wherein said filter material is HEPA filter material.

* * * * *